United States Patent [19]
Woodbury

[11] Patent Number: 5,481,925
[45] Date of Patent: Jan. 9, 1996

[54] LOW TURBULENCE AIRFLOW SENSOR

[75] Inventor: Ronald E. Woodbury, Largo, Fla.

[73] Assignee: Environmental Technologies, Inc., Largo, Fla.

[21] Appl. No.: 303,714

[22] Filed: Sep. 9, 1994

[51] Int. Cl.[6] ..................................... G01F 1/46
[52] U.S. Cl. ..................... 73/861.66; 73/861.65
[58] Field of Search ................. 73/861.66, 861.65, 73/202

[56] References Cited

U.S. PATENT DOCUMENTS

| | | | |
|---|---|---|---|
| 1,250,238 | 12/1917 | Spitzglass | 73/861.66 |
| 2,789,433 | 9/1949 | Goudy | 73/861.65 |
| 3,125,880 | 8/1960 | Oliveau | 73/861.65 |
| 3,685,355 | 8/1972 | DeBaun . | |
| 4,297,900 | 11/1981 | Brandt, Jr. | 73/861.66 |
| 4,344,330 | 8/1982 | Renken et al. | 73/861.66 |
| 4,372,171 | 2/1983 | Brandt, Jr. . | |
| 4,453,419 | 6/1984 | Engelke | 73/861.66 |
| 4,559,836 | 12/1985 | Coleman et al. | 73/861.66 |
| 4,602,514 | 7/1986 | Kurrle et al. . | |
| 4,602,517 | 7/1986 | Kurrle et al. | 73/861.66 |
| 4,735,100 | 4/1988 | Hajto . | |
| 4,823,615 | 4/1989 | Taha | 73/861.66 |
| 4,912,973 | 4/1990 | Milewski et al. . | |
| 5,036,711 | 8/1991 | Good | 73/861.66 |
| 5,123,288 | 6/1992 | Tench et al. . | |

Primary Examiner—Richard Chilcot
Assistant Examiner—Jewel V. Artis
Attorney, Agent, or Firm—Herbert W. Larson

[57] ABSTRACT

An airflow sensor is designed with features which enhance the accuracy of measurement. The central hub of the airflow sensor is made in an air foil shape to reduce noise and turbulence at that region. The airflow sensing tubes extend radially outwardly from the central hub and are made extremely thin in profile to minimize turbulence. Each airflow sensing tube has a plurality of spaced airflow receiving openings therethrough which are spaced from one another in a manner permitting each opening to receive air from a volume of air equal to the volumes of air from which other holes receive air flow. The downstream air collection tubes are circumferentially spaced between the first-mentioned airflow sensing tubes and have open ends to receive air from the open areas between the first-mentioned airflow sensing tubes. The airflow sensor is designed to be mounted within a conduit of generally circular cross-section and the mounting devices which mount the outer ends of the tubes to the inner walls of the conduit have turbulence-reducing air foil shapes.

11 Claims, 3 Drawing Sheets

LOW TURBULENCE AIRFLOW SENSOR

BACKGROUND OF THE INVENTION

The present invention relates to a low turbulence airflow sensor. Airflow sensors are known in the prior art. However, Applicant is unaware of any such device including all of the features and aspects of the present invention.

The following prior art is known to Applicant:

U.S. Pat. No. 3,685,355 to DeBaun discloses an air monitoring system wherein the airflow sensor includes radially outwardly extending arms with each arm having a plurality of perpendicularly disposed sensing tubes attached thereto. These sensing tubes are spaced such that the radial distance between adjacent sensing tubes decreases as the location of the sensing tubes increases relative to the center of the conduit so that "each sensor is so positioned as to lie approximately at the center of a cross-sectional segment of the casing that is equal in area to the cross-sectional casing segment within which each of the other sensors is centered". However, DeBaun fails to take steps to minimize turbulence in the region where the air sensor is located. DeBaun utilizes the perpendicular sensing tubes which, in conjunction with the radially outwardly extending arms, contribute to increased turbulence. The central hub of DeBaun is not designed in any way to reduce turbulence nor is the design of the connection points between the radially outwardly extending arms and the inner walls of the casing so designed. In contrast, in the present invention, thin profile radially outwardly extending sensing arms are provided extending outwardly from a streamlined central hub and extending radially outwardly to streamlined connection devices.

U.S. Pat. No. 4,297,900 to Brandt, Jr. discloses an averaging pitot primary system which utilizes radially outwardly extending sensing arms having enlarged shrouds surrounding each pitot tube. Again, Brandt, Jr. appears to make no effort to reduce turbulence around and about the airflow sensor.

U.S. Pat. No. 4,344,330 to Renken et al. discloses an average fluid flow sensor which is made up of either a circular sensing tube or a spiral sensing tube. The present invention differs from the teachings of Renken et al. as providing a streamlined low turbulence airflow sensor which consists of a plurality of radially outwardly extending airflow sensors which extend between streamlined connection points.

U.S. Pat. No. 4,372,171 to Brandt, Jr. discloses a nozzle pitot averaging primary which utilizes a plurality of radially outwardly extending tubes having their respective ends facing toward air flow to allow receipt of air flow therein. Brandt, Jr. fails to contemplate the streamlining of the present invention nor the structure for ensuring that each tube receives air from radially spaced concentric circles of equal area.

U.S. Pat. No. 4,453,419 to Engelke discloses a device for sensing the volummetric flow rate of air in a duct which includes the provision of radially outwardly extending arms having equally spaced openings therein. The flow sensing tubes extend outwardly from a somewhat streamlined central hub. Upstream and downstream sensing tubes are separated by flattened, enlarged walls. These flattened and enlarged walls increase the turbulence around the airflow sensor in a manner not contemplated by the present invention. Furthermore, the conical nature of the surfaces of the central hub of Engelke and the stepped surfaces thereof are inferior to the slightly rounded air foil shape of the central hub of the present invention.

U.S. Pat. No. 4,602,514 to Kurrle et al. discloses a device for measuring the volume of flow of gas in a duct which includes the use of a plurality of radially outwardly extending sensing tubes with the openings in the sensing tubes being arranged radially in a logarithmic pattern. Furthermore, the sensing tubes are formed of square cross-section. While the logarithmic pattern of the entrance ports of the sensing tubes is generally related to the teachings of the present invention, Kurrle et al. do not take advantageous steps to reduce turbulence around and about the airflow sensing tubes as is the case in the present invention.

U.S. Pat. No. 4,735,100 to Hajto discloses a fluid flow sensor having multiplying effect which includes forward and rearward facing airflow sensing devices extending linearly across a rectangular cross-section duct and separated by enlarged vertical walls. The present invention differs from the teachings of Hajto as providing improvements to reduce turbulence in and around the airflow sensor and as being particularly designed for use in a conduit of circular cross-section.

U.S. Pat. No. 4,912,973 to Milewski et al discloses a multiple point velocity probe wherein a plurality of radially outwardly extending and bent airflow sensing tubes are provided, with each airflow sensing tube having a plurality of equally spaced air receiving ports therein. The airflow sensing tubes extend outwardly from a central generally rectangular cubic hub. The present invention differs from the teachings of Milewski et al. as contemplating a central hub of air foil shape to reduce turbulence and spacing of the airflow sensor openings in a manner that each opening receives air from an area equal to the area which supplies air to the other openings.

U.S. Pat. No. 5,123,288 to Tench et al. discloses an averaging pitot probe having a single airflow sensing tube extending across a circular duct. As described, each of the holes lies on the boundary between adjacent areas within the conduit, however, the spacing between the openings is not designed in the manner of the present invention, to-wit, to ensure that air flow to each hole is from a region of equal area to the areas which supply air to the other holes.

SUMMARY OF THE INVENTION

The present invention relates to a low turbulence airflow sensor. The present invention includes the following interrelated objects, aspects and features:

(A) The inventive airflow sensor is intended to be mounted within a conduit of generally circular cross-section. The inventive airflow sensor is mounted within the conduit so that a central hub thereof is suspended at the center of the conduit. The central hub is made with upstream and downstream air foil-shaped regions which are designed to minimize air turbulence at that location and, thus, to reduce noise generated by air flow to an absolute minimum. The air foil shapes of the upstream and downstream regions of the central hub provide a smooth transition for air engaging the central hub upstream, flowing across the central hub and exiting downstream thereof. The rounded nature of the hub surfaces effectively reduces turbulence and noise.

(B) A plurality of upstream airflow sensing tubes, preferably four in number, extend radially outwardly from the central hub to locations of attachment at the inner walls of the conduit. These locations of attachment are provided with attachment members of streamlined air foil shape to minimize turbulence and noise at those locations as well. In the preferred embodiment, two adjacent upstream airflow sensing tubes are mounted to the inner walls of the conduit using these attachment members while the other two airflow sensing tubes terminate adjacent the inner walls of the conduit with collection tubes extending through the inner walls of the conduit at those locations to maintain the position of the airflow sensor within the conduit. These collection tubes are located immediately behind and downstream of the two associated airflow sensing tubes so that they are shielded from air flow to maintain turbulence and noise reduction.

(C) Downstream airflow sensing tubes are provided circumferentially angularly displaced from the upstream airflow sensing tubes, with each downstream airflow sensing tube being preferably equidistantly spaced between adjacent upstream airflow sensing tubes. Each downstream airflow sensing tube extends radially outwardly from the central hub a distance approximately one-half the radius of the conduit and each downstream airflow sensing tube has a single inlet comprising an opening in the end of each respective tube.

The inventive low turbulence airflow sensor is intended to be mounted in a circular cross-section conduit just upstream of a butterfly-type damper or can be mounted merely to measure air flow. The airflow sensor is fluidly connected to a control mechanism which receives air from the collection tubes representative of air flow upstream and downstream of the central hub and responsive thereto controls the position of the damper. The particular details of the controller mechanism do not form a part of the present invention and a controller mechanism such as that which is described in U.S. Pat. No. 4,453,419 to Engelke or any other suitable controller may be employed.

As such, it is a first object of the present invention to provide a low turbulence airflow sensor.

It is a further object of the present invention to provide such a device wherein the central hub and radially outwardly disposed attachment members for the airflow sensing tubes are made in an air foil-like streamlined configuration to reduce turbulence and noise.

It is a yet further object of the present invention to provide such a device wherein each airflow sensing opening of each airflow sensing tube is located within a cross-sectional area equal to the cross-sectional areas within which the other openings are located.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 3:
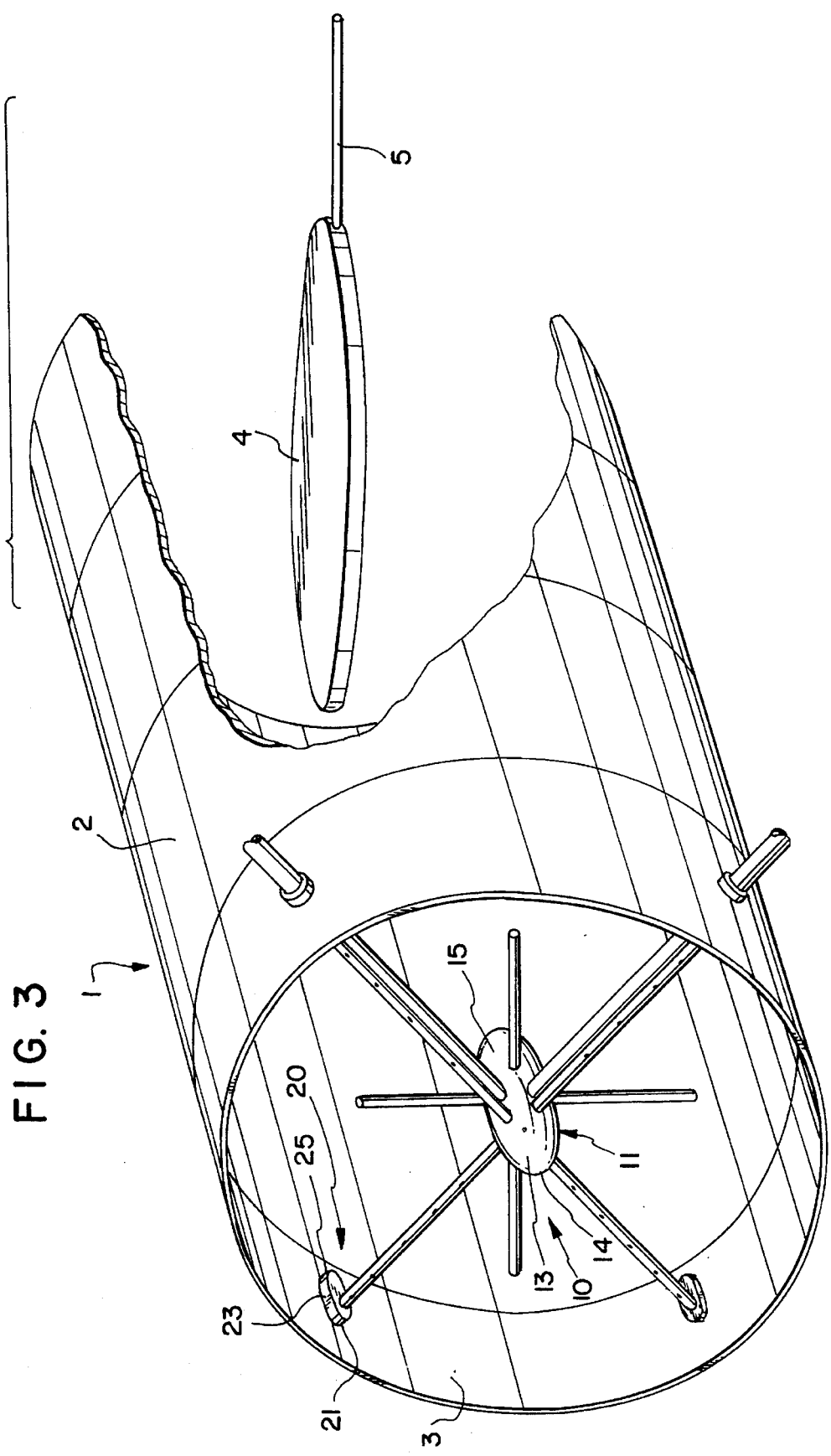
FIG. 3 shows a perspective view of the inventive airflow sensor as mounted in a conduit and with a portion of the conduit broken away to show the location of the associated damper.

With reference, first, to FIG. 3, a conduit of generally circular cross-section is designated by the reference numeral 1 and is seen to have an outer wall 2 and an inner wall 3. The inventive airflow sensor is generally designated by the reference numeral 10 and is seen to be mounted in the conduit 1 upstream of a damper 4 which is actuated in a manner known to those skilled in the art by an actuator operating on the actuating stem 5. The particular details of the controller mechanism do not form a part of the present invention and any suitable controller mechanism may be employed which receives pressure signals from the airflow sensor 10 indicative of the air flow through the conduit 1 and, responsive thereto, controls the position of the damper 4 within the conduit 1. U.S. Pat. No. 4,453,419 to Engelke discloses a typical controller mechanism.

Figure 4:
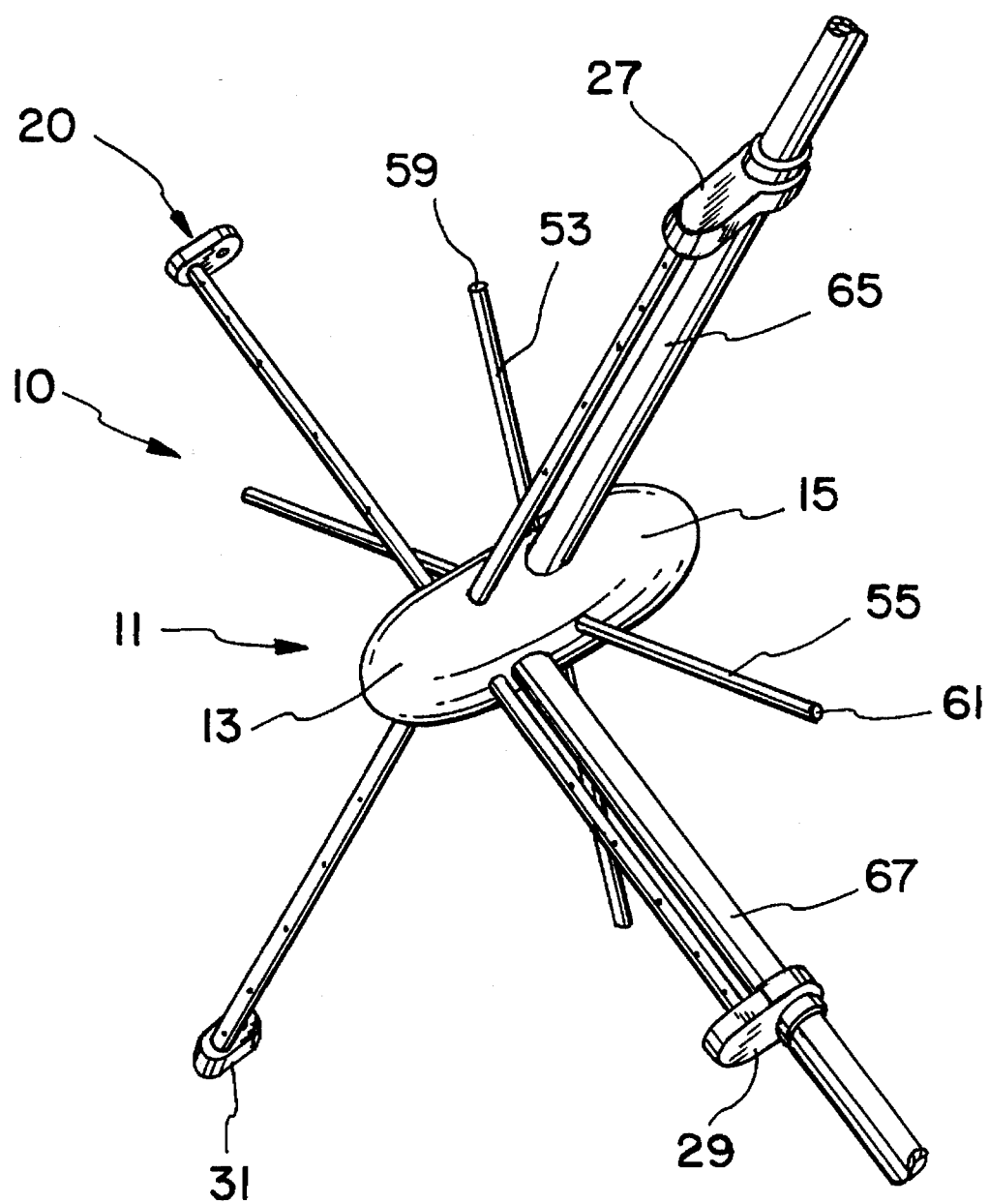
FIG. 4 shows a perspective view of the inventive airflow sensor.

As particularly seen with reference to FIGS. 3 and 4, the inventive airflow sensor has a central hub 11 with an upstream region 13 and a downstream region 15. As seen in FIGS. 3 and 4, the central hub 11 is made of an air foil shape with no sharp edges or sharp transition locations thereon. The smooth curved upstream tip 14 of the central hub is engaged by air flowing downstream through the conduit 1, which air smoothly flows over the surfaces of the upstream and downstream regions 13, 15, respectively, of the central hub and thence toward the damper 4 with little turbulence or noise being created through interaction with the central hub 11.

With further reference to FIGS. 3 and 4, it is seen that each of the connection locations between the inventive airflow sensor 10 and the inner walls 3 of the conduit 1 is made using a streamlined attachment member. With particular reference to FIG. 3, the attachment member 20 is seen to include an upstream tip 21 of arcuate configuration, an arcuately curved portion 23 extending downstream and an arcuately curved downstream tip 25. These features minimize turbulence and noise which would otherwise be created by air flow through the conduit 1 were these features not to be included in the attachment member 20. These same features are provided in the attachment members 27, 29 and 31 as best seen in FIG. 4.

Figure 1:
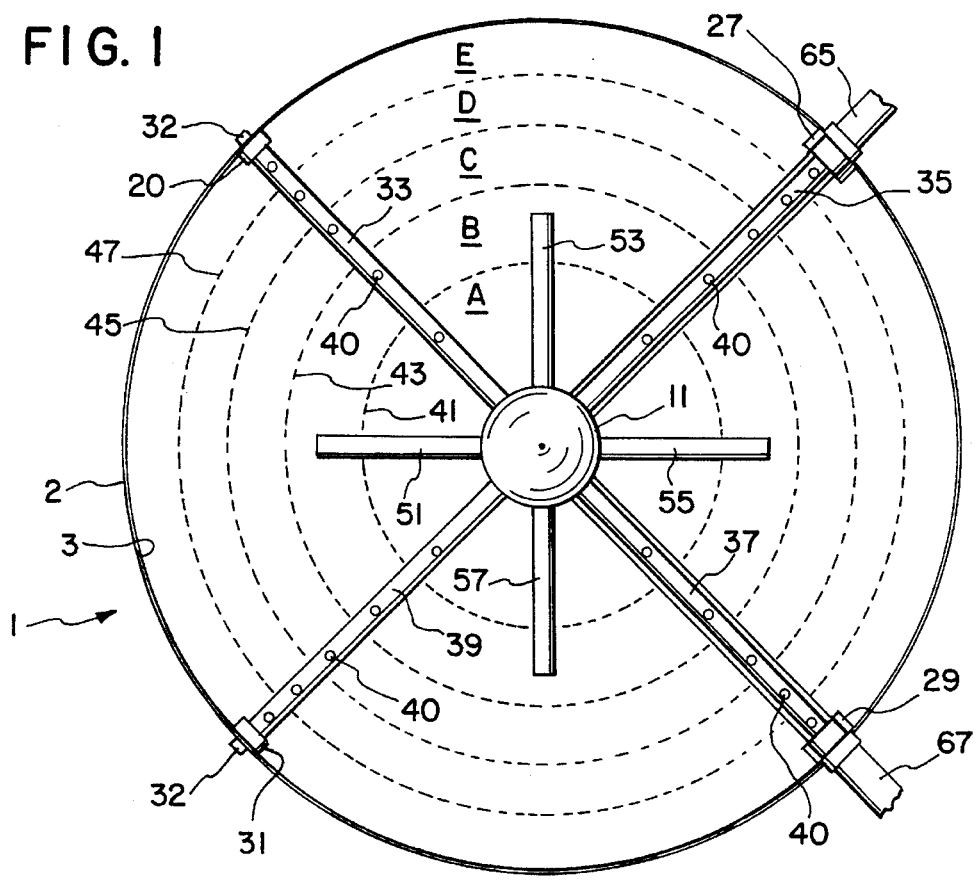
FIG. 1 shows a front view of the inventive airflow sensor as mounted in a conduit of circular cross-section with the dashed circles defining therebetween equal cross-sectional areas.

With reference, now, to FIG. 1, it is seen that airflow sensing tubes 33, 35, 37 and 39 are equally circumferentially spaced about the conduit 1. Each airflow sensing tube has a multiplicity of upstream facing openings 40 therethrough allowing access to the inner chamber of each such tube. The letters A, B, C, D and E in FIG. 1 are intended to denote regions of equal cross-sectional area within the conduit 1. Thus, the region A is defined by the dashed line 41. The region B is defined between the dashed lines 41 and 43. The region C is defined between the dashed lines 43 and 45. The region D is defined between the dashed lines 45 and 47. Finally, the region E is defined between the dashed line 47 and the inner wall 3 of the conduit 1. Again, each of these regions A, B, C, D and E defines an area equal to the respective areas of the other regions.

As also shown in FIG. 1, each opening 40 is located at a location within each respective region such that equal areas within the region are to either side of the opening. Thus, for example, each of the openings 40 within the region B is closer to the dashed line 43 than to the dashed line 41, however, as should be understood by those skilled in the art, the area between the openings 40 and the dashed line 43 is equal to the area between the openings 40 and the dashed line 41. In this way, the openings 40 are so located that each opening 40 receives flow from an area equal to the area from which other openings 40 receive flow.

With further reference to the figures, it is seen that downstream airflow sensing tubes 51, 53, 55 and 57 are provided and extend radially outwardly approximately one-half the radius of the conduit 1, with each downstream airflow sensing tube having a single opening at its radially outward end. These openings are represented by the openings 59 and 61 of the respective tubes 53 and 55 as seen in FIG. 4.

With reference to FIG. 4, in particular, it is seen that collection tubes 65 and 67 extend radially outwardly from the central hub 11 and, as best seen in FIG. 1, extend through the conduit 1 and thence to a controller mechanism (not shown).

Figure 2:
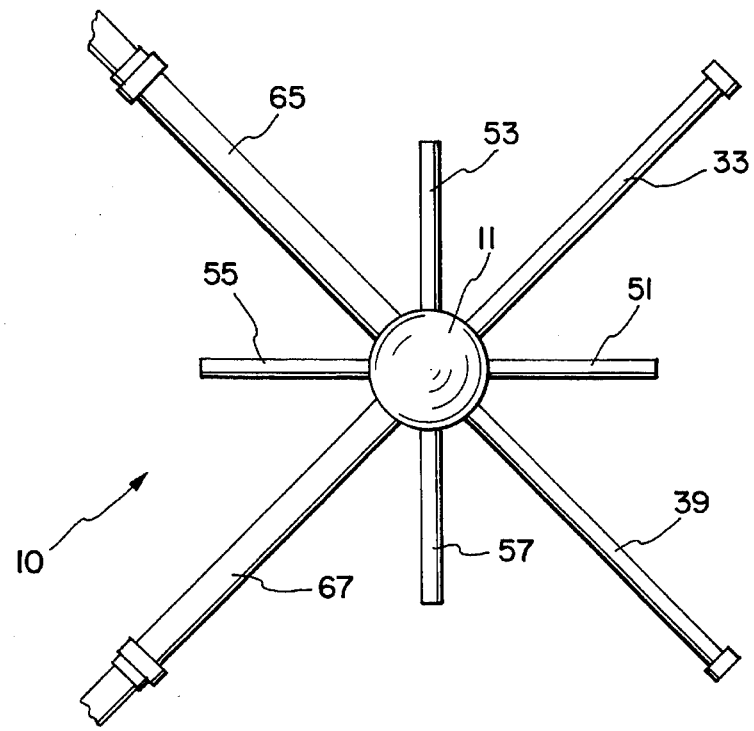
FIG. 2 shows a rear view of the inventive airflow sensor.

In the preferred embodiment of the present invention, the collection tube 65 receives air from the upstream airflow sensing tubes 33, 35, 37 and 39 whereas the collection tube 67 receives air from the downstream airflow sensing tubes 51, 53, 55 and 57 and conveys the air received thereby to the controller mechanism (not shown). The interconnection between the upstream airflow sensing tubes and the collection tube 65 as well as the connection between the downstream airflow sensing tubes and the collection tube 67 is located within the hub 11 and does not form an important part of the present invention. Such interconnection is conventional and consists of a suitable fluid coupling therebetween, in each instance. As best seen from comparison of FIGS. 1 and 2, the collection tube 65 is so mounted on the airflow sensor 10 that it is almost completely hidden behind the upstream airflow sensing tube 35 with respect to air flowing downstream within the conduit 1. Similarly, the collection tube 67 is almost completely hidden behind the upstream airflow sensing tube 37 with respect to air flowing downstream within the conduit 1. In this way, reduction of noise and turbulence is enhanced as compared to the prior art.

Through the teachings of the present invention, with the resultant drastic reduction in noise and turbulence, air within the conduit 1 flows smoothly over the airflow sensor 10 and thence to the damper 4 and downstream thereof. Applicant has found that these advances result in low turbulence which therefore gives low noise and pressure drop. The down stream air flow sensing tubes 51, 53, 55 and 57 provide a more highly amplified fluid pressure signal which enhances accuracy of measurement of air flow and, thereby, accuracy of positioning of the damper 4 within the conduit 1. The streamlined nature of the present invention allows accurate measurements without the requirement for a large pressure drop across the sensor as is the case with some prior art designs including, particularly, those which are disclosed in U.S. Pat. Nos. 4,453,419 and 4,735,100, which are described hereinabove in the BACKGROUND OF THE INVENTION.

In the preferred embodiment of the present invention, the upstream and downstream airflow sensing tubes are made of a light, metallic material while the central hub and peripheral attachment members are made of molded plastic. Of course, any suitable materials may be employed in manufacturing the present invention.

In the preferred embodiment of the present invention, the upstream airflow sensing tubes 33 and 39 are fastened to the conduit 1 utilizing threaded fasteners 32. Of course, any suitable fastening means may be employed so long as the enhanced streamlining of the present invention is not compromised. The position of the threaded fasteners 32 as shown in FIG. 1 in no way affects this streamlining since the threaded fasteners extend through the attachment members 20 and 31, respectively.

As such, an invention has been disclosed in terms of a preferred embodiment thereof which fulfills each and every one of the objects of the present invention as set forth hereinabove and provides a new and useful quiet, low turbulence airflow sensor of great novelty and utility with a complimentary energy savings to the user.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An airflow sensor adapted to be mounted within a flow conduit comprising:

a) a streamlined central hub of air foil shape having an upstream region smoothly transitioning to a downstream region;

b) at least two pair of diametrically opposed upstream airflow sensing tubes extending radially outwardly from said central hub, each of said upstream airflow sensing tubes including:

i) a plurality of radially spaced holes therethrough fluidly connecting regions exterior to said tube to an internal flow passage thereof, said holes being spaced from one another such that each hole receives air flow from an equal concentric cross-sectional area of a flow conduit; and ii) a streamlined attachment member for attaching said tube to an inner wall of a flow conduit; and c) a number of downstream airflow sensing tubes corresponding in number to a number of said upstream airflow sensing tubes, each downstream airflow sensing tube extending radially outwardly from said central hub a distance shorter than a distance of radial extension of said upstream airflow sensing tubes, each downstream airflow sensing tube having a single inlet at an end thereof and being circumferentially spaced from a respective adjacent upstream airflow sensing tube.

2. The sensor of claim 1, further including a first collection tube for collecting air from said upstream airflow sensing tubes and a second collection tube for collecting air from said downstream airflow sensing tubes.

3. The sensor of claim 2, wherein said first collection tube is mounted on said sensor directly downstream of one of said upstream airflow sensing tubes and said second collection tube is mounted on said sensor directly downstream of another of said upstream airflow sensing tubes.

4. The sensor of claim 1, including four upstream airflow sensing tubes and four downstream sensing tubes.

5. The sensor of claim 1, wherein each upstream airflow sensing tube has three holes.

6. The sensor of claim 1, wherein each upstream airflow sensing tube has four holes.

7. The sensor of claim 1, wherein each upstream airflow sensing tube has five holes.

8. The sensor of claim 1, wherein each downstream airflow sensing tube is about half the length of each upstream airflow sensing tube.

9. The sensor of claim 1, wherein there is a first and second pair of upstream airflow sensing tubes provided.

10. The sensor of claim 9, wherein the first pair of upstream airflow sensing tubes are smaller than the second pair of upstream airflow sensing tubes.

11. The sensor of claim 10, wherein all of the downstream airflow sensing tubes are about one-half the length of the first pair of upstream airflow sensing tubes.

* * * * *